United States Patent
Bening et al.

[11] Patent Number: 5,669,211
[45] Date of Patent: Sep. 23, 1997

[54] PIVOTAL MOUNTING FOR AUXILIARY BLOWER

[75] Inventors: Curtis Reinhard Bening, Burnett, Wis.; Harlin James Trefz, Jackson, Tenn.

[73] Assignee: Deere & Company, Moline, Ill.

[21] Appl. No.: 595,686

[22] Filed: Feb. 2, 1996

[51] Int. Cl.$^6$ ................................ A01D 34/70
[52] U.S. Cl. .................. 56/13.3; 56/16.6; 56/202
[58] Field of Search .................... 56/13.3, 13.2, 56/16.9, 16.6, 202, 320.2, 320.3, 243, 294

[56] References Cited

U.S. PATENT DOCUMENTS

| | | | |
|---|---|---|---|
| 2,856,785 | 10/1958 | Steel | 74/242.8 |
| 4,693,063 | 9/1987 | Hoepfner | 56/16.6 |
| 4,735,037 | 4/1988 | Benter | 56/13.3 |
| 4,936,885 | 6/1990 | Samejima et al. | 56/13.3 |
| 4,996,829 | 3/1991 | Saitoh et al. | 56/202 X |
| 5,018,344 | 5/1991 | Samejima | 56/13.3 |
| 5,240,461 | 8/1993 | Hohnl | 474/101 |
| 5,254,046 | 10/1993 | Hohnl | 474/101 |
| 5,542,243 | 8/1996 | Yuki et al. | 56/13.3 |

*Primary Examiner*—Terry Lee Melius
*Assistant Examiner*—Robert Pezzuto

[57] ABSTRACT

A detachable and swingable blower is provided for use with rotary mower decks. The blower is slidably and pivotally mountable on the deck, allowing it to quickly be swung open. A hand activated quick release latch mechanism serves to secure the blower with the mower deck and facilitates quick and easy access to the blower inlet for cleanout and/or service.

5 Claims, 5 Drawing Sheets

5,669,211

PIVOTAL MOUNTING FOR AUXILIARY BLOWER

TECHNICAL OF THE INVENTION

The present invention relates to auxiliary blowers utilized to propel cut grass and similar vegetation from a mower deck and to a collection receptacle such as a bagger. More specifically, it relates to a belt driven blower which is mounted with the mower deck to allow it to be easily opened for clean-out of the blower or quickly removed from the deck.

BACKGROUND OF THE INVENTION

Mowers adapted for cutting grass and similar vegetation are often used in conjunction with auxiliary blowers that propel the material from the mower deck, through a discharge duct and into a material collection device.

When wet or long grass is encountered, it can sometimes become difficult to propel the cut material through the blower. Accordingly, the blower or discharge duct frequently becomes blocked and the operator must stop, uncouple the blower and/or duct work, and remove the material. Should the material continue to accumulate and cause blockages, use of the blower must then be discontinued so that the cut material can be distributed over the ground.

SUMMARY OF THE INVENTION

It would therefore be desirable to provide an auxiliary blower which could be quickly and easily cleared of blocked material when necessary or easily removed should conditions become so difficult that the material cannot be propelled through the blower and collected.

Towards these goals there is provided a detachable auxiliary blower which can be slidably and removably mounted on a pivot rod carried on the mower deck. The blower has a hand activated latch that permits it to be swung open to allow quick and easy clean-out of the blower impeller chamber or the mower outlet.

Additionally, a shifting mechanism is provided on the blower that allows the operator to quickly release the drive belt tension so that the impeller will not be driven when the blower is cleaned out. The tension release also permits the belt to be replaced or uncoupled so that the blower can be removed from the deck when the operator does not want to utilize the blower and collection device.

DESCRIPTION OF THE PREFERRED EMBODIMENT

Figure 1:
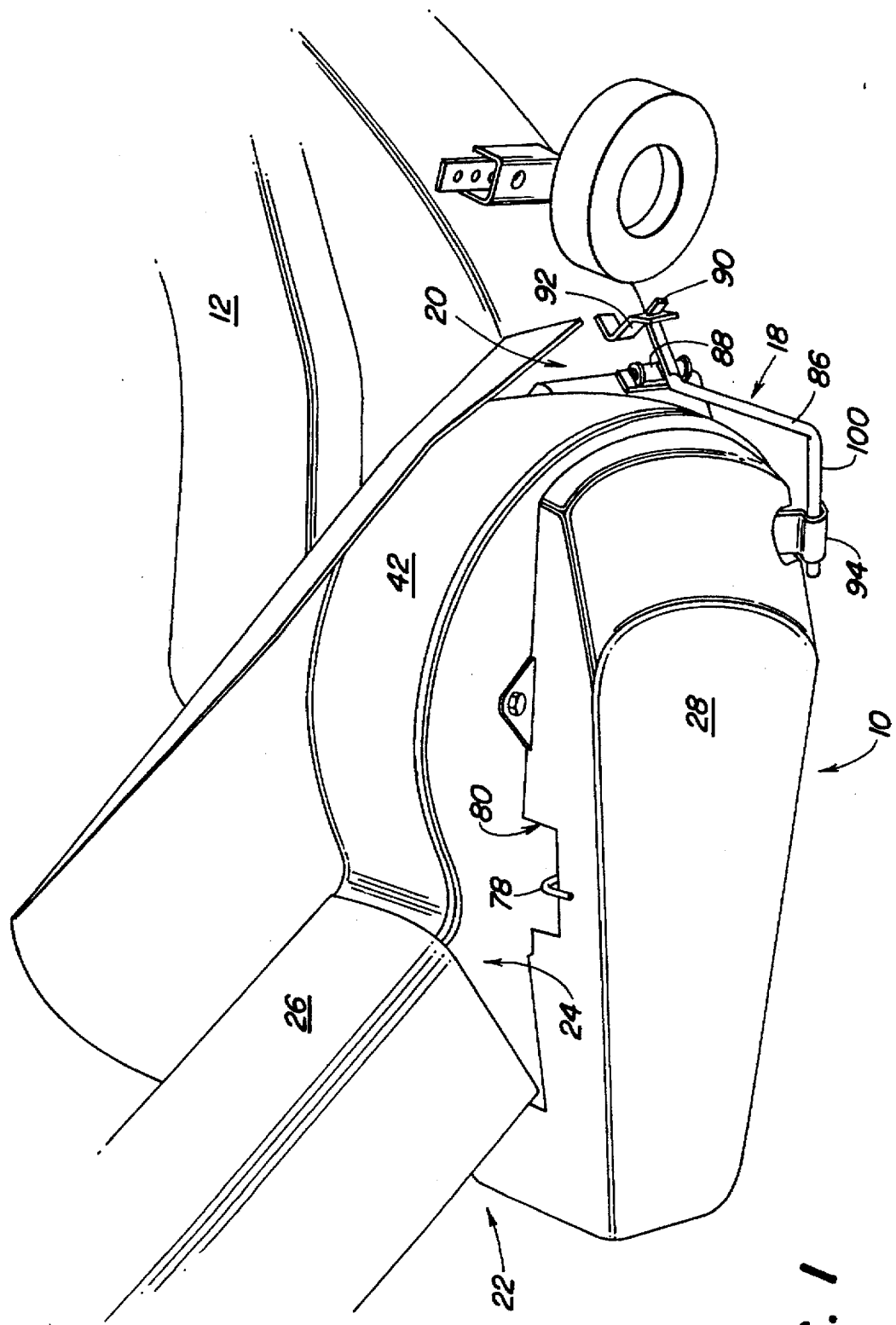
FIG. 1 illustrates a front elevational perspective view of the blower coupled with a mower deck.

Looking first to FIG. 1 there is shown a perspective view of the swingable blower attachment 10 mounted with a mower deck 12. The inlet opening 14 of the blower 10 is mounted to the outlet opening 16 of the deck 12 which, in turn, would typically be suspended beneath a tractor or similar type of vehicle.

The blower 10 is adapted to be removably coupled with the deck 12 and includes a latch mechanism 18 at its forward end portion 20 that secures it to the deck 12. The blower 10 includes at its rearward portion 22 an outlet opening 24 which is coupled with a discharge duct 26 that is utilized to convey material propelled by the blower 10 to a material collection device propelled by a tractor. The blower is equipped with a removable shield or cover 28 on its outer face that encloses and guards the belt drive components utilized to power it.

Figure 2:
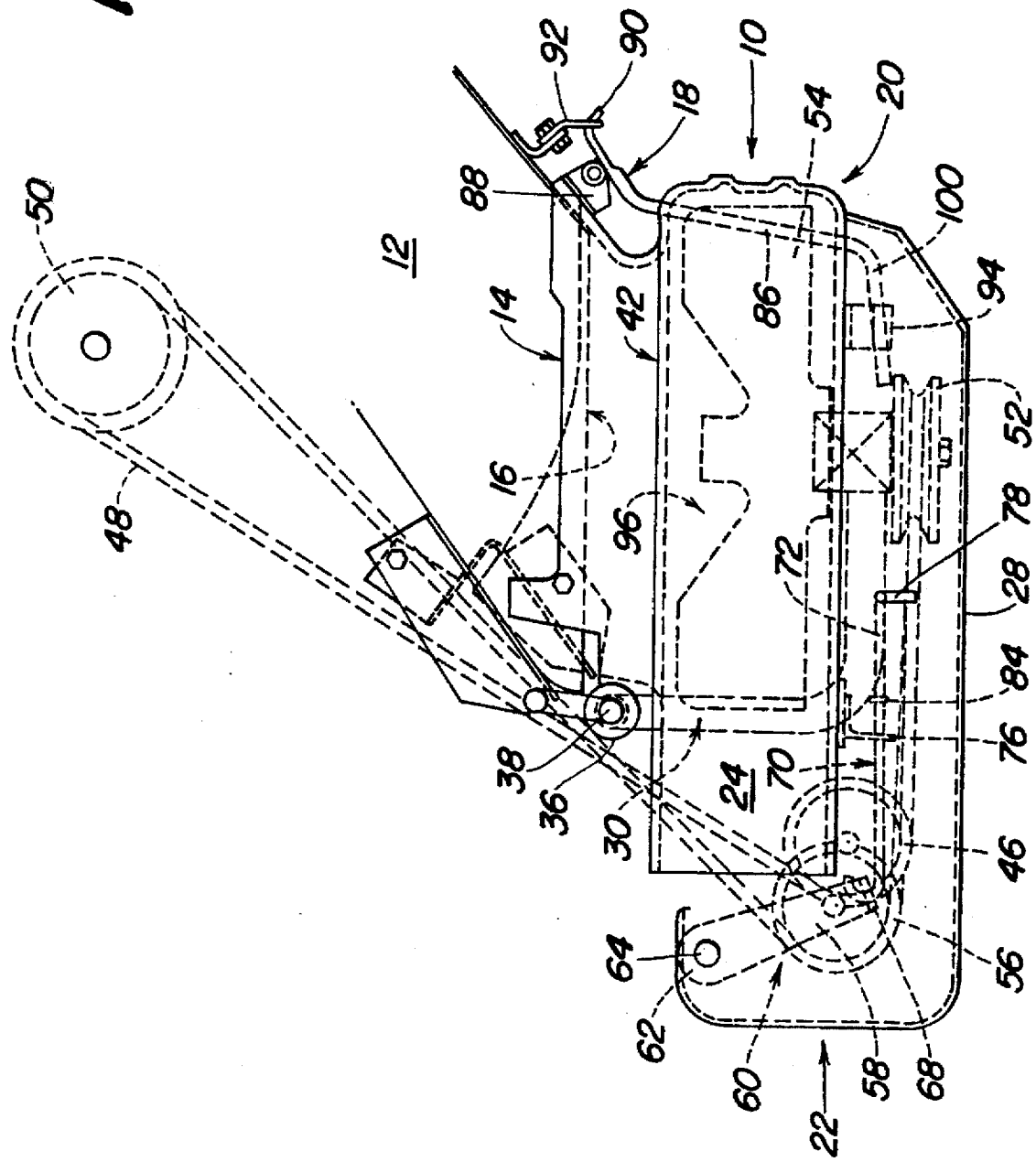
FIG. 2 illustrates a schematic top view of the blower in its operative position with the belt tensioned.
Figure 5:
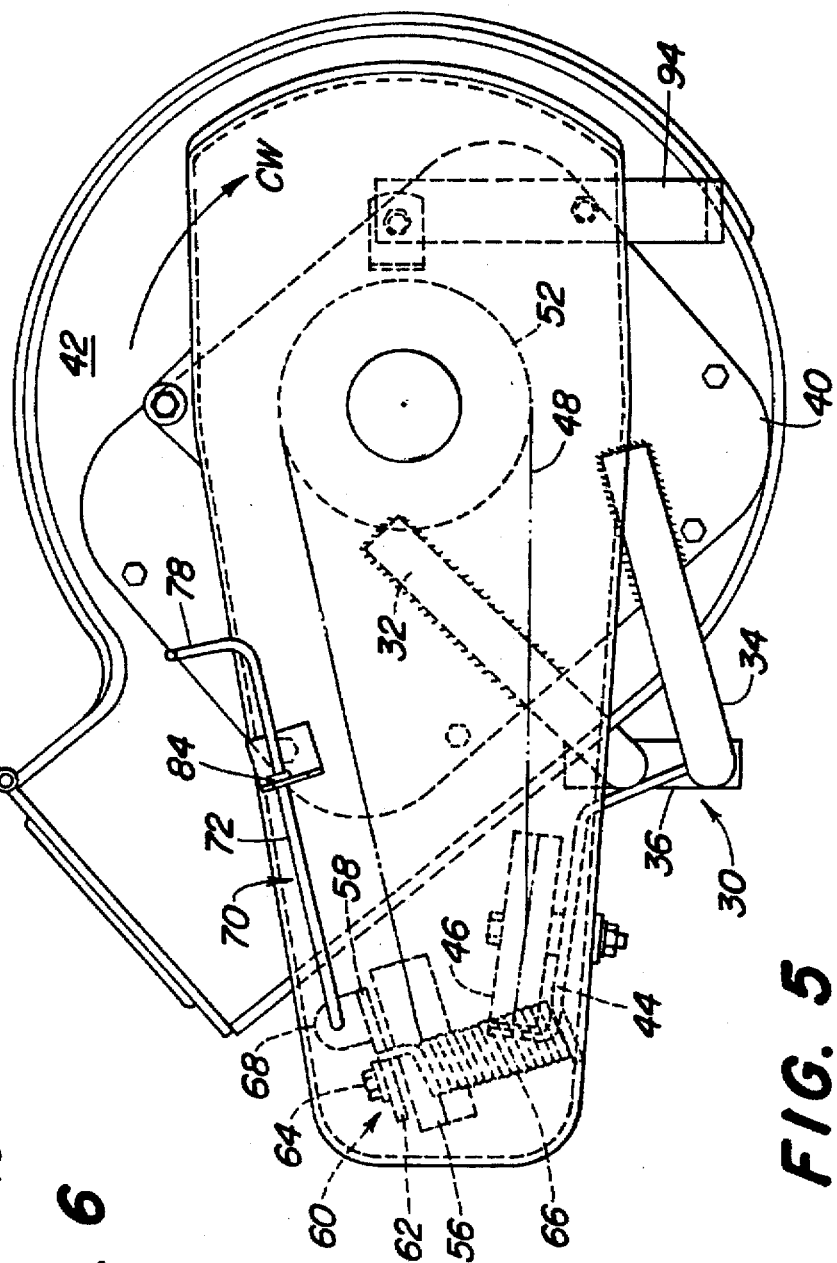
FIG. 5 illustrates a schematic side view of the blower when the belt is untensioned.

Looking now to FIG. 2 which shows a schematic top view of the blower 10 and outlet opening 16 of the mower deck 12, there is found an L-shaped frame member 30 that includes two support legs 32 and 34 and a sleeve 36 (See FIG. 5). The sleeve 36 is slidably received on a pivot or support rod 38 carried by the deck 12. The L-shaped frame 30 supports a plate 40 which, in turn, carries the blower housing 42.

As shown in FIG. 5, the L-shaped frame 30 supports a bracket 44 which carries a directional pulley 46 used to change the direction of the belt means 48 as it moves from the drive pulley 50 carried on the mower deck 12 to the pulley 52 coupled with the impeller 54.

A tensioning or idler pulley 56 is also carried on the outer end of the bracket 44. The tensioning pulley 56 is carried on one end portion 58 of a lever means 60 that has its other end portion 62 secured to a pivot means 64 mounted on the bracket 44. The lever means 60 is biased by spring 66 in a clockwise direction (as viewed in FIG. 2) to urge the tensioning pulley 56 clockwise about the pivot 64.

Figure 4:
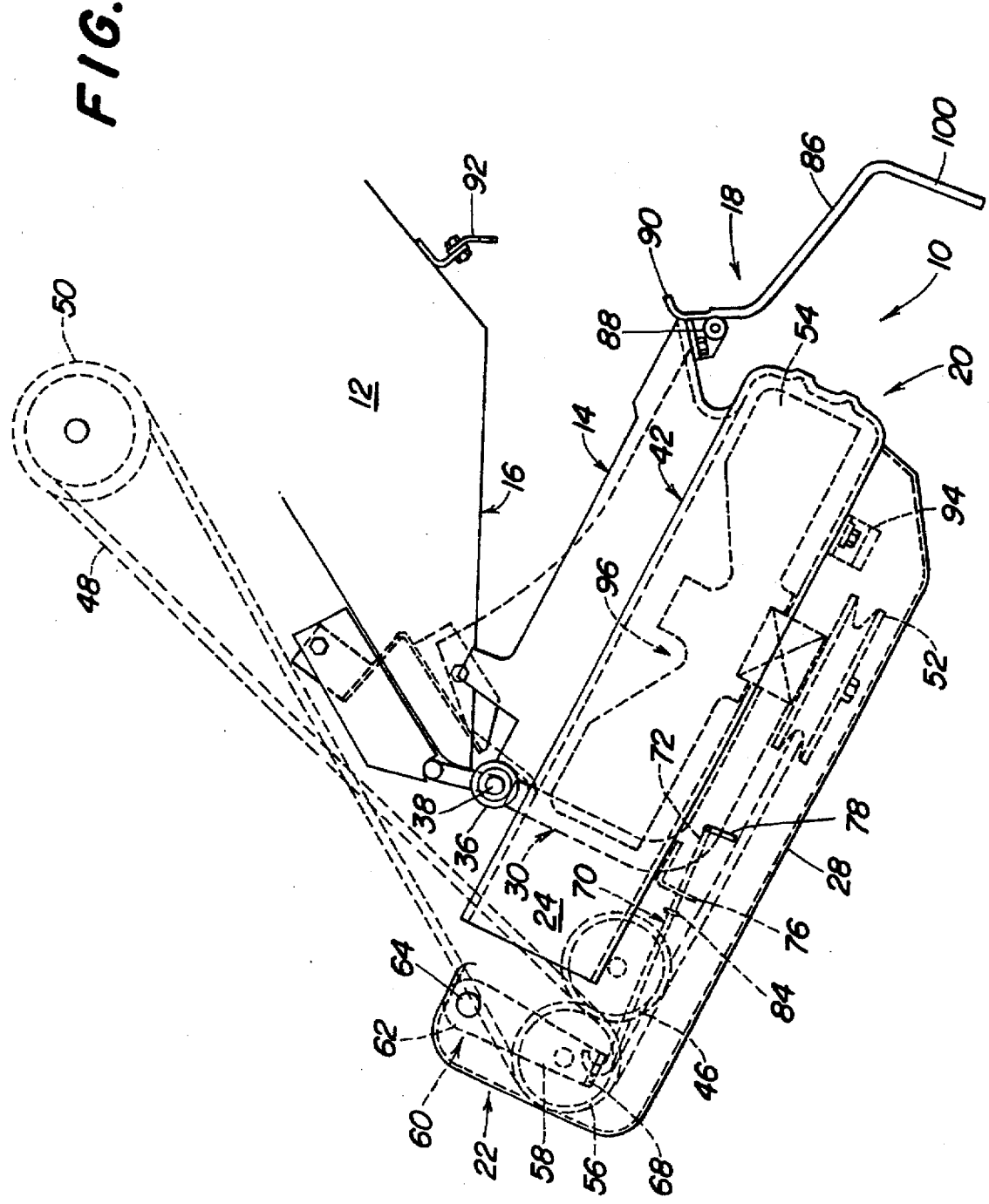
FIG. 4 illustrates a schematic top view of the blower opened and the belt tensioned.
Figure 7:
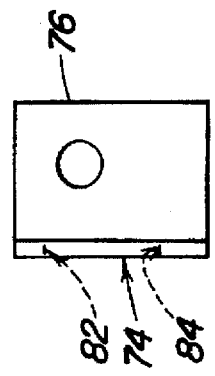
FIG. 7 illustrates a side view of the bracket shown in FIG. 5.
Figure 6:
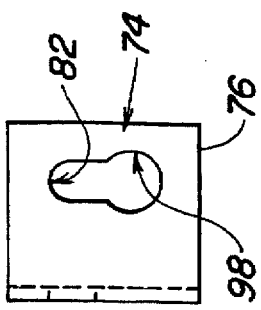
FIG. 6 illustrates the bracket which supports the shifting rod.

As shown in FIG. 4 the lever means 60 carries at its one end portion 58 an upstanding ear 68 having an opening through it. A shifting means 70 including an elongated rod 72 has one end secured in that opening. The rod 72 is slidably carried in a slot 74 in the bracket 76, which is best shown in FIGS. 6 and 7, and includes an upstanding handle 78 which projects out of the opening 80 in the shield or guard 28 (See FIG. 1). The slot 74 in the bracket 76 includes a thinner upper portion 82 where the rod 72 can also be positioned. The rod 72 includes a stop 84 secured around its circumference which has a diameter larger than the thinner width of the upper portion 82 of the slot 74 so that it will not pass through the slot 74 when the rod 72 is in that upper portion 82 of the bracket 76 and the spring 66 urges the stop 84 against the bracket 76.

Figure 3:
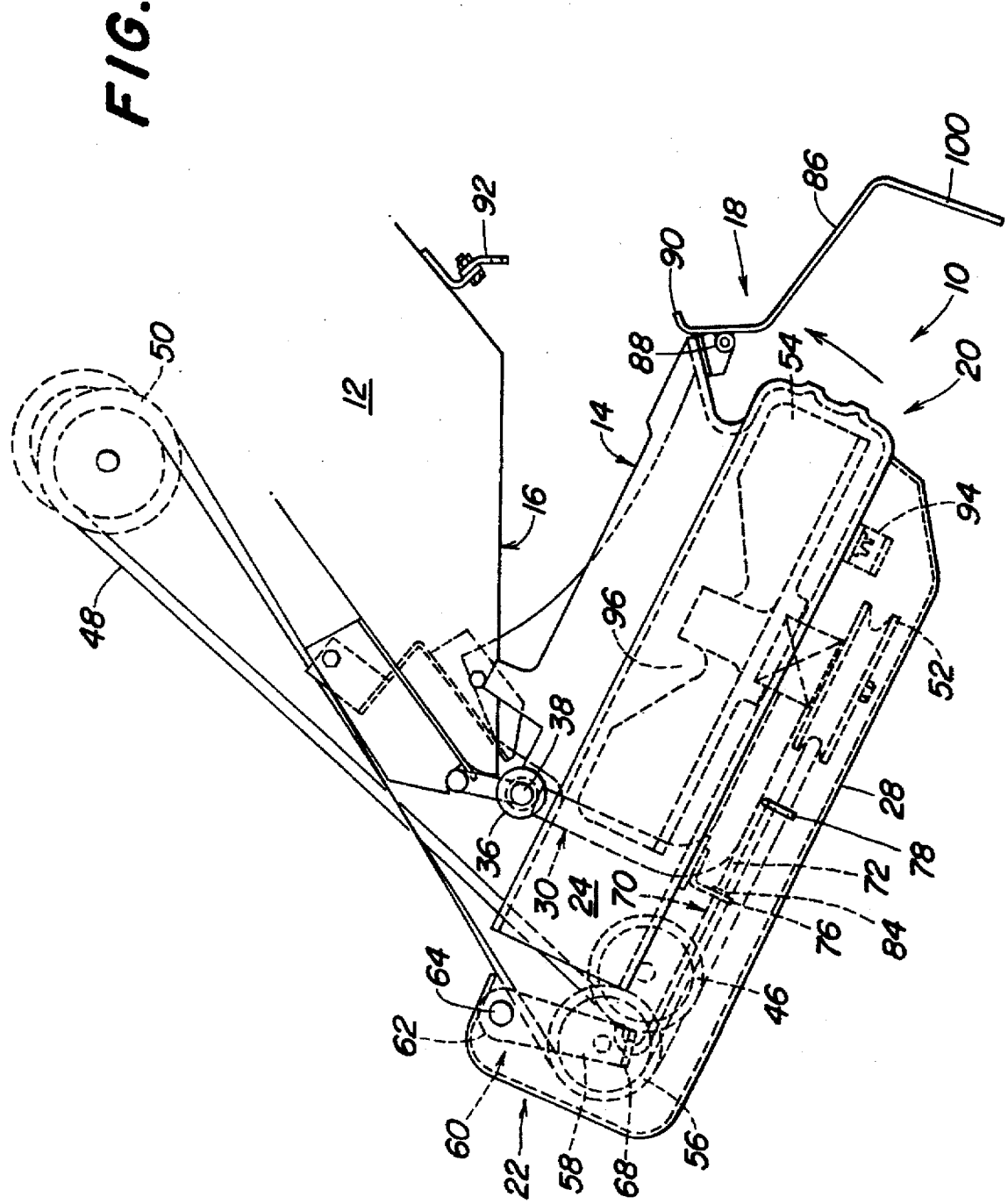
FIG. 3 illustrates a schematic top view of the blower opened to allow clean-out of the impeller chamber with the belt untensioned.

The blower 10 is further provided with the latching means 18 at its forward end portion 20 which takes the form in the preferred embodiment of a strap 86 of metal. As shown in FIGS. 1, 2 and 3, the strap 86 is pivotally secured to the deck at 88 and includes at its one end a hooked portion 90 which is adapted to be received in an opening of a tab 92 carried on the mower deck 12. The other end of the strap 86 is resilient enough to be secured under the downwardly projecting catch 94 which is carried on the blower housing 42.

Turning now to the operation of the auxiliary blower 10 and FIG. 1, it is shown that the blower 10 in its operative configuration is secured to the outlet opening 16 of the mower deck 12. At its forward end portion 20, the blower 10 is secured to the deck 12 by the latching means 18.

During operation, material cut by the blades of the mower deck 12 would be propelled through the outlet opening 16 of the mower deck 12 and into the inlet opening 14 of the blower 10. This material would then enter the impeller chamber 96 of the blower 10 where the clockwise rotation of the impeller 54, as viewed in FIG. 5, would compliment the movement of the cut grass to direct it up and through the outlet 24 of the blower 10.

The belt 48 powering the impeller 54 is driven by the drive pulley 50 carried on top of the mower deck 12. The belt 48 is entrained around the directional pulley 46 carried at the rear portion 22 of the blower 10, then around the impeller pulley 52 and into the tensioning pulley 56, returning to the mower deck drive pulley 50.

Providing tension on the belt 48 to assure that it drivingly powers the impeller 54, is the spring loaded tensioning pulley 56 carried on the lever means 60. The lever means 60 is urged in a clockwise fashion, as shown in FIGS. 2, 3 and 4 by the spring 66 to maintain tension on the belt 48 during its operation. While in the drive configuration, the rod 72 is slidably resting within the lower, larger opening 98 of the bracket 76 with the stop 84 positioned to the one side of the bracket 76, see FIGS. 2 and 6.

Should the operator encounter wet grass, long grass or other conditions which might contribute to blockage of flow of material through the blower 10 and the need for cleaning the blower 10, he would first stop power to the belt drive, then open the blower 10 to the position illustrated in FIG. 3. To open the blower 10, he would push in on the handle 100 of the strap 86, move it down to release it from the catch 94 carried by the blower 10. As it is moved from the position shown in FIG. 2 to that shown in FIG. 3 the hooked end 90 of the strap or latch member would slide out of the opening in the tab 92 carried on the mower deck 12. The forward end portion 20 of the blower 10 could then be pivotally swung around the axis of the pivot rod 38 to the position shown in FIG. 3 to permit access to the impeller chamber 96 of the blower 10 or the outlet opening 16 of the deck 12.

Should the operator want to disengage the belt tension when he opens the blower 10 for cleanout, he would raise the shifting rod 72 from the large opening 98 in the bracket 76 so that it is in the thinner upper portion 82 of the bracket 76. Since the rod 72 is secured to the clockwise biased lever means 60, it would be pulled by the lever means 60 into abutment with the bracket 76 as the blower 10 is opened to untension the belt 48. Should the operator elect to relieve tension on the belt 48 after the blower 10 is opened, he would move the rod 78 from the position shown in FIG. 4 to that shown in FIG. 5 by pulling on the shifting handle 78 moving the stop 84 through the large opening 98 in the bracket 76 (See FIG. 6) and raising the rod 72 up and into the thinner slot 82. The clockwise bias of the spring 66 acting on the rod 72 would then urge the stop 84 into abutment with the bracket 76 and the belt 48 would be untensioned as shown in FIG. 3.

With the present invention there is provided an auxiliary blower that is usable with a mower deck in conditions where wet and/or long grass make blockages in the flow path likely. The blower is pivotally mounted with the deck and provided with a quick release latch at its forward end to facilitate easy and quick opening of the blower for cleanout should blockages occur. The belt tensioning quick release allows the operator to swing the idler pulley in a counterclockwise fashion against the spring bias to release tension should he wish to disengage the belt during the cleanout activity. Further the belt tensioning release permits the operator to provide enough slack in the belt to remove the belt from the drive pulley on the mower should he want to change belts and/or remove the belt and blower from the deck. The pivot support on the blower which takes the form of a sleeve can be slidably received on the upstanding rod carried by the deck to allow for quick and simple removal of the blower as the sleeve is lifted up and off the pivot rod.

We claim:

1. A blower attachment usable with a mower deck having a drive pulley and an outlet opening;

the attachment including a housing with inlet and outlet openings and an impeller rotatably carried in the housing, said impeller being drivingly connected to an impeller pulley;

a belt tensioning pulley operatively coupled with the attachment;

belt means entrained around the drive, tensioning and impeller pulleys;

a tensioning release mechanism connected with the belt tensioning pulley and operable to shift said tensioning pulley between a first belt tensioning position and a second belt untensioned position;

a pivot and sleeve carried between the deck and housing;

the sleeve adapted to receive the pivot and permit swingable movement of the housing between a first position adjacent the deck wherein the inlet opening is adjacent to the outlet opening of the mower deck and a second position wherein one end portion of the housing is swung away from the mower deck to separate the inlet opening from the outlet opening of the deck; and latching means between the deck and housing for releasably securing the one end portion of the housing with the deck, said latching means being adapted to be released and permit swinging movement of the housing between its first and second positions when the tensioning pulley is in either its first or second position, and including a resilient arm releasably engagable with the catch means.

2. The invention defined in claim 1 wherein the resilient arm is pivotally carried on the housing and includes a hooked portion that is adapted to be removably received in a slot means carried on the deck.

3. The invention defined in claim 2 wherein the sleeve opens vertically and the pivot includes a rod that can be removably placed therein.

4. The invention defined in claim 3 wherein the rod is secured with the deck and the sleeve is carried by the housing.

5. The invention defined in claim 1 wherein the arm of the latching means, while engaged with the catch means, can be moved between over-center and non over-center positions.

* * * * *